Feb. 9, 1971    J. W. CHAIVRE    3,561,820
WHEEL NUTS
Filed May 16, 1969
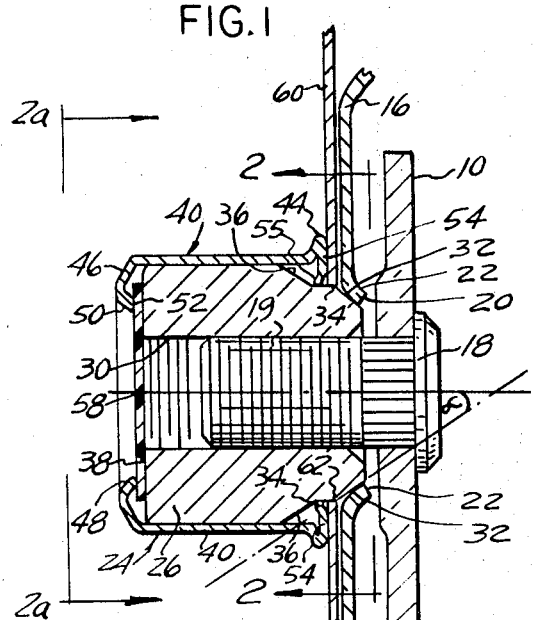
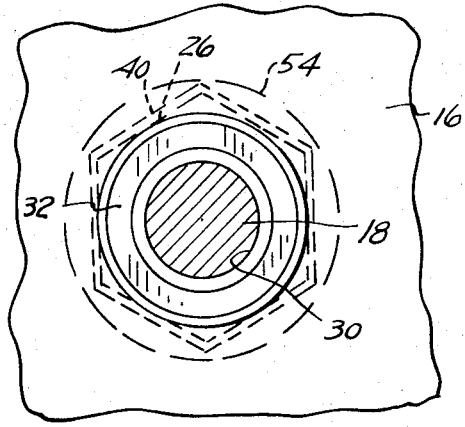
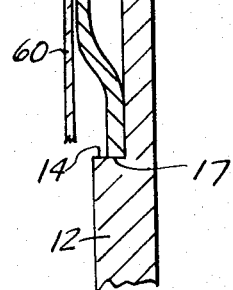
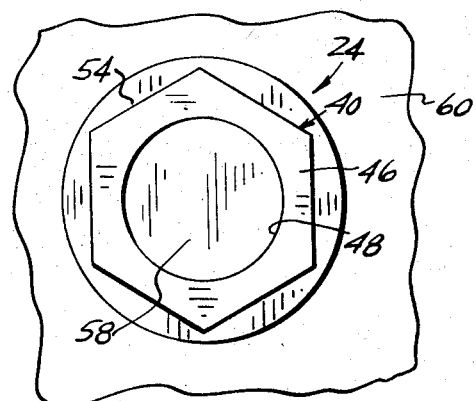
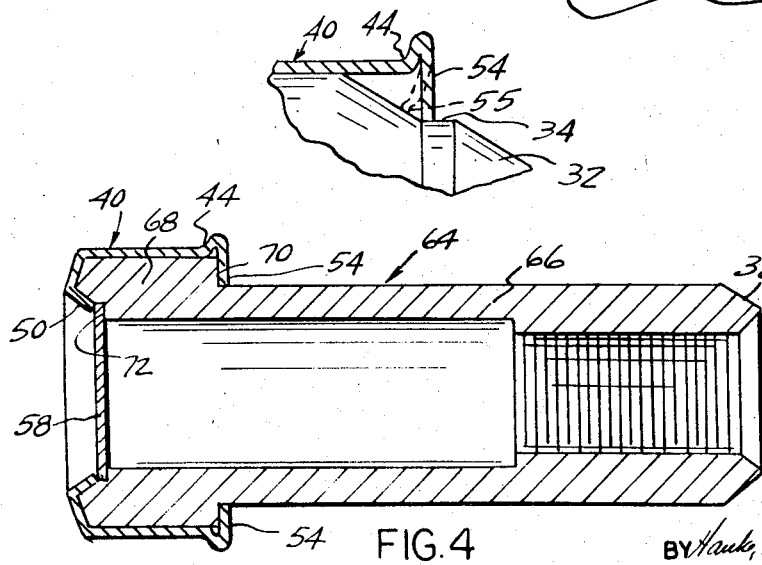
INVENTOR
JOSEPH W. CHAIVRE
ATTORNEYS United States Patent Office 3,561,820
Patented Feb. 9, 1971

3,561,820
WHEEL NUTS
Joseph W. Chaivre, Royal Oak, Mich., assignor to Towne Robinson Fastener Company, Dearborn, Mich., a corporation of Michigan
Filed May 16, 1969, Ser. No. 825,330
Int. Cl. B60b 7/06
U.S. Cl. 301—9                                   7 Claims

ABSTRACT OF THE DISCLOSURE

A nut for fastening a wheel to an axle flange and having a conical end adapted to mate with a conical depression in the wheel. The conical end extends into a cylindrical land portion and a chamfered portion of the nut head which is covered with a hard corrosion resistant cap extending all around the sides of the nut head, and which is crimped to the nut to retain a disc or button of plastic material to close the nut. The cap is expanded into a radial flange adjacent the chamfered portion of the nut head to retain a wheel cover in spaced relation to the wheel.

BACKGROUND OF THE INVENTION

(I) Field of the invention

The present invention relates to wheel and wheel cover fasteners, and more particularly to a cap for a wheel nut completely encasing the nut head for protection of the stud against corrosion and to provide a pleasing appearance, and which is additionally provided with means to securely fasten and retain a wheel cover on a wheel.

(II) Description of the prior art

Plated or capped vehicle wheel nuts which provide a protective covering of bright, hard, corrosion and substantially wear resistant material for the nut to protect the nut against corrosion and damage by the use of the wheel wrench and for decorative purposes, are known in the art. Such a capped wheel nut is, for instance, disclosed in applicant's prior U.S. Pat. No. 3,364,806.

Capped nuts are also known, which are provided at their outer end with a colored disc of plastic material to cover the threaded aperture of the nut and to provide an attractive appearance.

In these known nuts, however, difficulties have been encountered in securely retaining the plastic disc within the cap of the nut in a manner preventing it from being accidentally dislodged. Due to these difficulties, plastic discs in such nuts are generally loosely retained in the cap of the nuts permitting moisture to penetrate past the disc and into the threaded aperture of the nut, thereby causing corrosion of the threads of the nut and of the wheel stud.

It is also known in the art to retain wheel covers on the wheel by means of the wheel nuts. Although this method is of particular advantage in preventing the loss of the wheel cover due to impact or bouncing of the wheel and to make theft of the wheel cover more difficult, it has been found that ordinary wheel nuts are not suitable for this purpose since the attachment of the wheel cover by means of the wheel nuts interferes with a secure attachment of the wheel to the axle flange. Ordinary wheel nuts have a conical or chamfered end adapted to match with a chamfered depression in the wheel when tightened on the wheel studs. The wheel is usually supported on an axle flange which has a central hub portion and a plurality of studs disposed at equiangular spacings along a common stud circle around the central aperture of the wheel, which are adapted to receive the equally spaced studs of the axle flange. The holes are usually formed in the shape of conical depressions to match the conical or chamfered ends of the wheel nuts so that when the wheel nuts are tightened on the studs the engagement of the conical ends of the wheel nuts with the conical depressions of the wheel accomplish accurate centering of the wheel on the central hub portion of the axle flange. Obviously, accurate securement of the wheel on the axle flange is important for proper running of the wheel, and for this purpose, the chamfered or conical surfaces in the stud holes of the wheel as well as the chamfered nut ends are accurately formed to close tolerances so that when the nuts are tightened on the studs the wheel will be perfectly centered on the axle flange. Any interference affecting these surfaces is highly objectionable and for this reason the attachment of the wheel cover by means of wheel nuts has been generally rejected since the known practice provided an assembly in which the wheel covers were disposed between the nuts and the wheels and this interfered with the accurate fit of the nuts within the conical depressions of the wheel.

A flanged nut provided with a button insert has been disclosed and described in U.S. Pat. No. 379,214 to E. Firth et al. The nut of this patent, however, is not capped to provide a pleasing shiny appearance and does not provide the specific relationship of an accurately formed conical surface with a flange portion disposed remote therefrom which serves to retain a wheel cover in such fashion as not to interfere with the accurate fit of the nut in the conical depressions in the wheel. Further, there is no showing in this patent of the method of the present application of securing the cap to the nut to provide an integral flange in such fashion as to serve to securely retain the cap on the nut and at the same time provide a secure mounting of the button or disc member to the nut.

SUMMARY OF THE INVENTION

The present invention provides an improved wheel nut provided with a cap of stainless steel so as to produce a pleasing appearance. The nut and the cap of the wheel nut are constructed such as to receive and retain a colored button or disc at the outer end of the nut. The button is retained by a crimped edge of the cap, which presses the disc onto the end of the nut and the inner end of the cap is formed into a radial flange abutting against the cylindrical land portion of the nut adjacent the conical end of the nut in such a way as not to interfere with the accurate fit of the conical end within the chamfered depression of the wheel. Adjacent the cylindrical land portion, the nut is provided with a chamfer disposed at an angle identical to the angle of the conical end of the nut. By this arrangement, when the nut is tightened on the wheel stud the wheel cover which is abutted by the flange of the cap of the nut causes the flange to ride up on the chamfer of the nut provided adjacent the cylindrical land portion of the nut to thereby tighten the cap onto the nut and to thereby cause pressure to be exerted by the crimped edge of the cap onto the colored disc insert. This provides an efficient seal between the nut, the cap and the insert, preventing the entrance of moisture and dirt into the nut.

Additional advantages and novel features of the present improved capped wheel nut will become apparent or will be particularly pointed out in the following detailed description.

BRIEF DESCRIPTION OF THE DRAWINGS

The following detailed description refers to the attached drawings, in which the same reference numerals refer to similar parts throughout, and in which:

FIG. 1 is a cross section through a portion of a wheel and axle flange assembly showing the present improved wheel nut in position to secure a wheel and a wheel cover to the axle flange;

FIG. 1a is an enlarged fragmentary detail view showing the relationship between the cap flanges and the surface of the nut;

FIG. 2 is a bottom plan view of the wheel and nut assembly shown in FIG. 1 as seen along line 2—2 thereof;

FIG. 2a is a top plan view of the wheel and nut assembly shown in FIG. 1 as seen along line 2a—2a thereof;

FIG. 3 is a separate cross sectional view of the cap used for the improved nut shown in FIGS. 1 and 2; and FIG. 4 is another embodiment of an improved capped wheel nut constructed in accordance with the present invention.

DESCRIPTION OF THE PREFERRED EMBODIMENTS

With reference to FIGS. 1–3, the assembly in FIG. 1 comprises an axle flange 10 provided with a central hub portion 12 which forms a radial ledge or seat 14 adapted to support a wheel 16 in central position on the axle flange by means of a central wheel aperture 17.

In order to secure the wheel 16 on the axle flange 10, a plurality of wheel studs, one of which is shown at 18, are provided on the flange in radially spaced relation relative to the central hub portion 12. The wheel 16 is provided with a plurality of apertures, one of which is shown at 20, which number is identical to the number of wheel studs 18 for extension of each of the studs 18 through one of the apertures 20 when the wheel is assembled on the flange 10. The stud apertures 20 are formed with a conical depression 22 radially around the inner edge for a purpose to be described hereafter. This assembly as so far described is of conventional well known construction and need not further be shown or described in detail.

To secure the wheel 16 to the axle flange 10, a plurality of wheel nut assemblies 24 are provided, only one of which is shown in FIGS. 1 and 2. The wheel nut assembly 24 is of improved construction and comprises a nut 26 generally made of a low carbon steel. The body of the nut is preferably hexagonal in shape to provide a plurality of planar angularly disposed adjoining surfaces 28 adapted to be engaged by a socket wrench or the like for tightening or loosening of the nut. The nut 26 is provided with a central threaded aperture 30 adapted, in assembly, to engage the threads 19 of the wheel stud 18.

The lower end of the nut 26 is provided with a radial conical surface 32, which extends into a cylindrical land portion 34. Adjacent to the land portion 34, the radial outer surface of the nut is chamfered as at 36 preferably at an angle parallel to the angle of the conical surface 32. The top of the nut 26 is provided with a flat planar surface 38 centrally located around the threaded aperture 30.

A sheet or cap 40 covers the radial outer surface of the nut 26, which is preferably made of bright, polished, stainless steel to produce a shiny appearance. As described in more detail in applicant's prior Pat. No. 3,364,806, the cap 40 is made of sheet metal preferably of a thickness of between .015" and .030". As particularly noted in FIG. 3, the cap 40 is formed to closely match the contour of the nut 26 and the bottom end of the cap is provided with an increased diameter portion in the form of a skirt 42, which forms a radial shoulder 44 around the lower portion of the cap 40. The top 46 of the cap 40 is provided with a central aperture 48 formed by an inwardly directed depression in the shape of a conical rim 50. In the complete nut assembly as shown in FIG. 1, the cap 40 is drawn tightly over the nut body 26 so that, normally, the edge 52 of the conical rim 50 of the top aperture 48 of the cap abuts the planar top surface 38 of the nut. The skirt portion 42 of the cap is then crimped around the shoulder 44 to form a radial flange 54 having an internal radial edge 56, which, in assembly, as shown in FIG. 1, is adapted to be seated on the cylindrical land portion 34 of the nut between the conical end surface 32 and the chamfer 36. Normally, the flange 54 is disposed at a right angle to the radial surface of the cap 40, as will be seen from FIGS. 1 and 1a, whereby the flange 54 securely locks the cap 40 on the nut 26 so that the flange cannot move beyond the chamfer 36 of the nut.

In the complete wheel assembly as illustrated in FIG. 1, when the nut 26 is tightened on the stud 18 the conical end 32 of the nut is caused to engage the matched conical depression 22 of the wheel aperture 20. Due to the precision formed conical surfaces on the nut the wheel 16 will be accurately centered in relation to the seat 14 on the central hub 12 of the axle flange 10. When this is accomplished the center line of the stud 18, wheel aperture 20 and nut 26 coincide with each other along a common axis $x$. The chamfer or angle of the conical end surface 32 of the nut 26, as well as the matching surface of the conical depression 22 of the wheel aperture 20, are formed such as to be concentric with the axis X within five thousandths (.005") of an inch, so that accurate centering of the wheel 16 will be assured upon tightening of the wheel nuts. As can best be seen in FIG. 1, the cap 40 is constructed such that the flange end will not interfere with the proper tightening of the nut and assures full engagement of the conical end 32 with the conical depression 22 of the wheel aperture 20.

With reference to FIGS. 1 and 1a and as herein specifically disclosed, the cap 40 of the nut assembly 24 is adapted to retain a disc or button 58 on top of the nut 26, which, in assembly, closes the cap aperture 48 and thereby simultaneously closes the threaded aperture 30 of the nut. In assembly, as shown in FIGS. 1 and 2, the disc 58 will be visible through the cap aperture 48 and for that reason is preferably colored so as to provide a pleasing appearance. The disc 58 is made from thin, flat sheet material and, although a synthetic material is preferred due to the ease of coloring, any other suitable material may be used.

The disc 58 is placed on the planar hub surface 38 of the nut prior to placing the cap 40 over the nut. After the cap 40 has been put in place, the flange 54 is formed to extend around the cylindrical land portion 34 of the nut and is then crimped as indicated at 55 in FIGS. 1 and 1a to thus securely lock the cap 40 to the nut 26. By means of crimping of the flange 54 on the nut 26, the cap 40 will be drawn downwardly upon the nut causing the edge 52 of the cap aperture to be depressed upon the disc 58, to thereby firmly lock and retain the disc on the flat top surface 38 of the nut. Thus, a tight sealing arrangement is provided between the disc and the nut assembly to prevent the entry of dirt and moisture into the nut.

With still further reference to FIGS. 1 and 1a, the improved wheel nut assembly 24 may advantageously be used as a wheel cover retention means by the provision of the cap flange 54. In this instance, the wheel cover, indicated at 60 in FIG. 1, is provided with apertures 62, only one of which is shown, corresponding in number and radial spacing to the wheel apertures 20, and which have a diameter slightly larger than the diameter of the cylindrical land portion 34 of the nut so that, in assembly, the wheel cover 60 will be retained over the wheel 16 by means of the cap flange 54, as shown in FIG. 1. Normally, the wheel cover 60 is made of thin sheet metal and shaped like a convex disc having a radial edge (not shown) abutting against the wheel 16. Due to the convex shape, the wheel cover is somewhat flexible so that upon tightening of the nut assembly 24 the wheel cover will be securely attached to the wheel 16. As indicated more in detail in the enlarged portion shown in FIG. 1a, the cap flange 54 is likewise somewhat flexible so that when the nut assembly 24 is tightened upon the stud 18 against the wheel cover 60 the edge 56 of the cap flange will be slightly deflected inwardly of the cap against the chamfer 36 of the nut 26, as illustrated in broken lines in exaggerated proportion in FIG. 1a, to thereby provide a firm lock for the cap 40 and, simultaneously, to cause an even more tight clamping of the disc 58 upon the top 38 of the nut by means of the edge 52 of the aperture 48 of the cap.

FIG. 4 illustrates a further embodiment of a capped nut member, which, in this instance, comprises a long nut 64 having an internally threaded shank portion 66 extending into a hexagonal nut head 68. The junction of the hexagonal nut head with the shank portion provides a shoulder 70. The internal bore of the nut head is counterbored to provide a ridge 72 which is adapted to receive a disc 58. In assembly, the nut head 68 is capped with a cap 40 in a manner similar to the embodiment in FIG. 1, except that, in this instance, the radial flange 54 of the cap is adapted to abut against the shoulder 70 of the long nut to thereby firmly lock the cap 40 and disc 58 onto the nut head 68.

Thus, it is apparent from the foregoing description that by the present disclosure an improved capped wheel nut has been provided having means to securely retain a colored disc visible within the head of the nut and having resilient flange means to firmly lock the cap on the nut and assure a tight sealing engagement between the disc and the nut. Additionally, the cap flange may be utilized to retain a wheel cover.

I claim:
1. A wheel and wheel nut asesmbly, comprising:
an axle flange;
at least one wheel stud projecting from said axle flange having a threaded end;
a wheel having at least one aperture for extension of said stud therethrough, said aperture having a conical rim;
a nut comprising a body portion having a central threaded aperture for engagement with the threaded end of said stud, said nut having a planar top surface and a conical end portion adapted to mate with the conical rim of said wheel aperture;
a cap member disposed around said body portion of said nut in close proximity thereto, having an outer end and an inner end, said inner end terminating adjacent said conical end of said nut and formed into a radial flange, said outer end being crimped around a marginal edge of said top surface of said nut; and
a disc disposed on said planar top surface of said nut for retainment by said crimped outer end of said cap so that said cap and said disc provide a sealed enclosure for said nut.

2. The assembly as defined in claim 1, in which said body portion of said nut is provided with a cylindrical land portion of smaller diameter than said body portion adjacent said conical end and said radial flange of said cap being disposed to surround said cylindrical land portion.

3. The assembly as defined in claim 2, in which said cylindrical land portion is connected to said body portion by a chamfered surface disposed at an angle parallel to the angle of said conical end.

4. The assembly as defined in claim 2, in which said radial flange comprises a radially outwardly extending crimped over rim portion and an inwardly extending planar surface having a central aperture with a diameter slightly larger than the diameter of said cylindrical land portion.

5. The assembly as defined in claim 4, in which said planar surface of said radial flange is staked at a plurality of locations against said chamfered surface to securely lock the cap on said body portion of said nut and causing said crimped outer end of said cap to be pressed upon said disc to provide a sealing engagement of said disc with said nut.

6. The assembly as defined in claim 1, further comprising a wheel cover disposed over said wheel for attachment by said nut, said wheel cover having at least one aperture coaxial with the aperture of said wheel for extension of said wheel stud therethrough, said radial flange of said cap of said nut when said nut is tightened on said stud providing a retention means for said wheel cover separate from the wheel retention means of said nut so as to not interfere with the fit of said conical end of said nut within said wheel aperture.

7. The assembly as defined in claim 6, in which said wheel cover comprises a body of resilient sheet material which upon tightening of said nut on said stud tends to deflect outwardly against said radial flange of said cap to tighten said flange against said chamfered portion of said nut.

References Cited

UNITED STATES PATENTS

| 2,694,997 | 11/1954 | Alger | 85—55X |
| 3,356,421 | 12/1967 | Trevarrow | 301—37 |
| 3,364,806 | 1/1968 | Chaivre | 85—35 |

FOREIGN PATENTS

| 524,699 | 8/1940 | Great Britain | 85—55 |

RICHARD J. JOHNSON, Primary Examiner

U.S. Cl. X.R.

85—35; 301—37